United States Patent [19]

Yamashita

[11] Patent Number: 5,414,228
[45] Date of Patent: May 9, 1995

[54] HANDWRITTEN CHARACTER INPUT DEVICE

[75] Inventor: Kazuhiko Yamashita, Takatsuki, Japan

[73] Assignee: Matsushita Electric Industrial Co., Ltd., Osaka, Japan

[21] Appl. No.: 84,813

[22] Filed: Jun. 28, 1993

[30] Foreign Application Priority Data

Jun. 29, 1992 [JP] Japan ................... 4-171077

[51] Int. Cl.⁶ .................. G08C 21/00; G06K 9/00; G06K 9/62; G06K 9/46
[52] U.S. Cl. ........................... 178/18; 178/19; 178/20; 382/89; 382/159; 382/202
[58] Field of Search .............. 178/18, 19, 20; 382/13, 382/14, 24

[56] References Cited

U.S. PATENT DOCUMENTS

| Re. 33,936 | 5/1992 | Miyamori | 178/18 |
|---|---|---|---|
| 4,656,317 | 4/1987 | Tsugei | 178/18 |
| 4,670,751 | 6/1987 | Enokido et al. | 178/18 |
| 4,685,142 | 8/1987 | Ooi et al. | 382/13 |
| 4,883,926 | 11/1989 | Baldwin | 178/18 |
| 4,947,156 | 8/1990 | Sato | 178/18 |
| 5,023,408 | 6/1991 | Murakami | 178/19 |
| 5,117,297 | 5/1992 | Nobile | 178/18 |
| 5,134,388 | 7/1992 | Murakami et al. | 178/19 |
| 5,191,622 | 3/1993 | Shojima et al. | 382/13 |

FOREIGN PATENT DOCUMENTS

2113386 4/1990 Japan .
522949 3/1993 Japan .

Primary Examiner—Stephen Chin
Assistant Examiner—Vijay Shankar
Attorney, Agent, or Firm—Price, Gess & Ubell

[57] ABSTRACT

The present invention discloses a handwritten character input device for entering a handwritten character into a microcomputer accommodated inside of the handwritten character input device, the handwritten character input device comprising a digitizer including a stylus pen and a tablet, the stylus pen with which the handwritten character is drawn on the tablet, the handwritten character formed of at least one stroke; an erasure request detection unit for detecting that erasure of the whole or part of the strode data is requested when they include a predetermined feature or they end in a predetermined area; and a stroke data erasure unit for cancelling stroke data representing the strokes which were drawn on the tablet and transferred thereto, and erasing them if request for the erasing operation is detected by the erasure request detection unit.

17 Claims, 6 Drawing Sheets

HANDWRITTEN CHARACTER INPUT DEVICE

BACKGROUND OF THE INVENTION

1. Field of the Invention

The present invention relates to a handwritten character input device employed to input handwritten characters or handwritten instructions to a computer.

2. Description of Related Art

In input of a handwritten character, a stroke is drawn with a stylus pen on a tablet. The handwritten character is then recognized based upon strokes entered by a handwritten character input device into a computer. Examples of handwriting recognition methods are disclosed in Japanese Patent Publication No. 5-22949.

According to a conventional handwritten input device, a stroke error is detected only after the character is completed including the stroke error; and the stroke error is corrected by erasing the entire character and rewriting it. Further, the erasing of the character is managed by the user either by entering the command or selecting the command from the menu. To be concrete, in execution of the command-driven program, the user enters the command directing the erasure/rewrite of the character. In execution of the menu-driven program, the user selects the delete operation from the menu as well as designates the character including the stroke error so that the character will be erased immediately; or selects the eraser from the menu to convert the stylus pen into the eraser, and erases with tracing over the character with the eraser. As a further example, Japanese Patent Publication 2-113386 discloses a handwritten character input device whereby the character will be erased if it includes a stroke longer than the threshold value.

On the other hand, if no stroke error is found in the complete character, a character recognition unit accommodated inside of the handwritten character input device recognizes the character.

Thus, the conventional handwritten character input device executes the error correction only after the input of the character is completed. Consequently, it has the disadvantage of recognition error of the character caused by the uncorrected stroke error. That is, when two characters differ from each other only in one stroke, one of them may be misidentified as the other unless the stroke distinguishing them is drawn correctly. Taking two of English letters as an example, "E" is distinguished from "F" in one horizontal stroke at the end. We assume that the user, having "F" in mind, draws the horizontal stroke by mistake. In this case, "F" will be mistakenly recognized as "E", unless the stroke error is corrected immediately.

Furthermore, the conventional handwritten character input device has the disadvantage of laborious processes at erasing the data. That is, the ongoing input operation is forced to cease and the command directing the erasing operation is selected by the user.

SUMMARY OF THE INVENTION

Accordingly, it is a primary object of the present invention to provide a handwritten character input device which implements immediate correction of a stroke error as well as eliminates the laborious processes at the erasing operation.

The above object may be fulfilled by a handwritten character input device for entering a handwritten character into a microcomputer accommodated inside of the handwritten character input device, the handwritten character input device comprising: a digitizer including a stylus pen and a tablet, the stylus pen with which the handwritten character is drawn on the tablet, the handwritten character formed of at least one stroke; an erasure request detection unit for detecting if erasure of the strokes is requested; and a stroke data erasure unit for cancelling stroke data representing the strokes which were drawn on the tablet and transferred thereto, and erasing them if request for the erasing operation is detected by the erasure request detection means.

The erasure request detection unit may detect that the erasure of stroke data is requested when they include a predetermined feature.

The erasure request detection unit may detect that the erasure of stroke data is requested when one of the strokes included in the stroke data ends in a predetermined area, the number of the predetermined area being one or more than one.

The erasure request detection unit may direct inclusion of the stroke data which will be cancelled by the stroke data erasure unit to be one of all the strokes and part of the strokes, the strokes drawn on the tablet.

The predetermined feature may include one of circles and zigzags, the number of the circles and the zigzags being determined beforehand so that the predetermined feature will be different from any of existing letters.

The predetermined number for circles and the zigzags may be one of a first number and a second number, the first number as the predetermined number indicating that all the strokes which have been drawn on the tablet are to be erased, and the second number as the predetermined number indicating that part of the strokes which have been drawn on the tablet are to be erased.

The predetermined area may be one of a first area and a second area, the stroke ending in each of the first area and the second area informing the erasure request detection unit that all the strokes and part of the strokes are to be erased respectively, the strokes having been drawn on the tablet.

The handwritten character input device may further comprise a unit for dividing the stroke into segments, the stroke representing a digital map of xy coordinates each of which is relevant for an input point of the stroke on the tablet, by forming an original vector from a couple of the input points next to each other to aim in a direction that the stroke is drawn, and replacing the original vector with one of an x vector and a y vector which is approximate to the original vector, the x vector and the y vector being perpendicular to each other; and a unit for detecting if a start segment and an end segment of consecutive segments crosses with each other, the start segment with which the stroke starts and the end segment with which the stroke ends while the number of the consecutive segments being four or more than four, whereby the detection of the circles is operated.

The handwritten character input device may further comprise a unit for dividing the stroke into segments, the stroke representing a digital map of xy coordinates each of which is relevant for an input point of the stroke on the tablet, by forming an original vector from a couple of the input points next to each other to aim in a direction that the stroke is drawn, and replacing the original vector with one of x vector and y vector which is approximate to the original vector, the x vector and the y vector being perpendicular to each other; a unit for detecting a turning point if it is detected that three consecutive segments include a long segment, a short segment, and a long segment in order, as well as the two long segments aim at opposite directions from each other; and a unit for detecting another turning point if it is detected that two consecutive segments aim at opposite directions from each other, whereby the detection of the zigzags is operated.

The handwritten character input device may further include a character recognition unit for recognizing the handwritten character based upon stroke data remaining unerased after the cancellation and the erasure of the stroke data erasure unit.

The above object may also be fulfilled by a handwritten character input method for entering a handwritten character, which is formed of at least one stroke and drawn with a stylus pen on a tablet, into a microcomputer, the method comprising: a first step at which stroke data representing the strokes of the handwritten character are received; a second step at which it is examined if cancellation and erasure of the stroke data was requested; a third step at which the stroke data are cancelled and erased in accordance with the examination at the second step; and a fourth step at which the handwritten character is identified based upon at least part of the stroke data remaining unerased after the cancellation and the erasure at the third step.

The examination at the second step may include segmentation of the stroke as well as detection of a predetermined feature in the stroke.

The predetermined feature to be detected may include one of circles and zigzags, the number of the circles and zigzags being determined beforehand so that the predetermined feature will be different from any of existing letter.

At the second step it may be detected if terminating xy coordinates of the stroke included in the stroke data locate inside of a predetermined area, the number of the predetermined area being one or more than one.

The predetermined area may include a first area and a second area, the stroke ending in the first area indicating that the stroke data to be erased at the third step include all the strokes which have been entered into the handwritten character input device, while the stroke ending in the second area indicating that the stroke data to be erased at the third step include part of the strokes which have been entered into the handwritten character input device.

In this construction, when the user recognizes that a stroke drawn on the graphic tablet is not correct, he/she will provide a predetermined feature to the stroke. The incorrect stroke including the predetermined feature is detected by the predetermined feature detection unit as a stroke error. Subsequently, the stroke erasure unit cancels the incorrect stroke detected by the predetermined feature detection unit and erases it. The character is recognized by the character recognition unit based upon the stroke data including the strokes remaining unerased at the examination of the predetermined feature detection unit.

Moreover, validity of each stroke is determined in accordance with the xy coordinate of the input point on the tablet. When the predetermined terminating coordinate detection unit detects that the terminating xy coordinates of the stroke place inside of the predetermined area, the stroke will be detected as a stroke error and erased.

Thus, the handwritten character input device of the present invention realizes the immediate correction of the incorrect stroke; therefore, recognition error of the character will hardly happen. Moreover, it realizes quicker and easier data correction compared to the conventional one. To be concrete, the cease of the on-going input operation as well as the input of the command by the user both of which used to be prerequisite for the erasure/rewrite operation will be eliminated.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Embodiment 1

Figure 1:
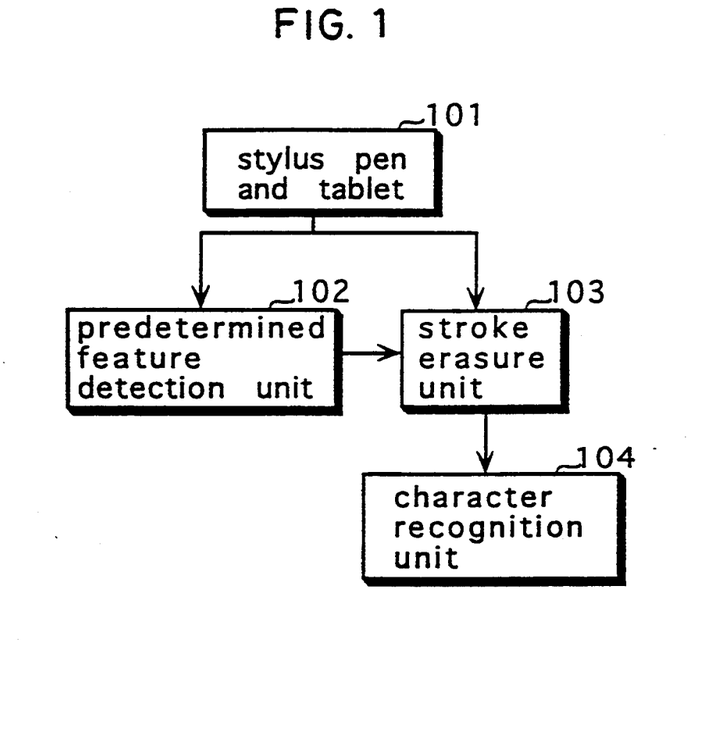
FIG. 1 is a block diagram depicting construction of the handwritten character input device in a first embodiment of the present invention.

Construction of a handwritten character input device employed in a first embodiment of the present invention will be described hereunder with reference to FIG. 1. As shown in the figure, the handwritten character input device comprises a digitizer 101, consisting of a stylus pen and a tablet, which enables the user to enter handwritings into a computer, a predetermined feature detection unit 102 for detecting a predetermined feature included in a stroke on the tablet, a stroke erasure unit 103 for cancelling and erasing the stroke including the predetermined feature, and a character recognition unit 104 for recognizing a complete handwritten character drawn on the tablet.

Operation of the handwritten character input device will be described. The stylus pen starts drawing a stroke on the tablet, and stroke data including a series of xy coordinates representing a digital map of the stroke are delivered into the buffer (not illustrated) accommodated inside of the tablet. At detachment of the stylus pen from the tablet, in other words at completion of the stroke, the stroke data are transferred to the predetermined feature detection unit 102 and the stroke erasure unit 103. The predetermined feature detection unit 102 looks into the stroke data for a coincidence with one of the predetermined features, and informs the stroke erasure unit 103 with the investigation result. When the consistency is found, the stroke erasure unit 103 erases the stroke data. Otherwise, the stroke data are transferred to the character recognition unit 104.

The recognition of the character will start when a box designated for the character is filled with the stroke data and subsequently the input to a next box starts; or a function button for the recognition operation is clicked by the user. In the case that the stroke error is found in the character at its recognition process, the character is recognized as another character; a symbol such as "?" is displayed on the screen so that the user will be notified of the stroke error; or all of the stroke data constituting the character will be eliminated automatically.

Figure 2:
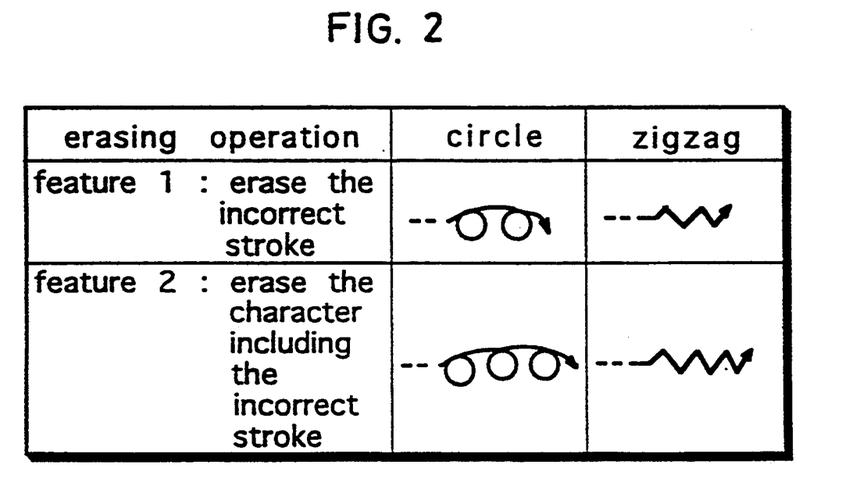
FIG. 2 shows an example of predetermined feature included in the stroke to be erased.

Examples of predetermined features will be described with reference to FIG. 2. Two circles or two zigzags (feature 1) at the end of the stroke direct the erasure of only the incorrect stroke. That is, when one of the feature 1 (two circles or two zigzags) is detected by the predetermined feature detection unit 102, the stroke including the feature 1 will be erased. Also three circles or three zigzags (feature 2) at the end of the stroke direct the erasure of the entire character including the incorrect stroke. That is, when one of the feature 2 (three circles or three zigzags) is detected by the predetermined feature detection unit 102, all the strokes drawn prior to the feature 2 as well as the stroke including the feature 2 will be erased.

Figure 3:
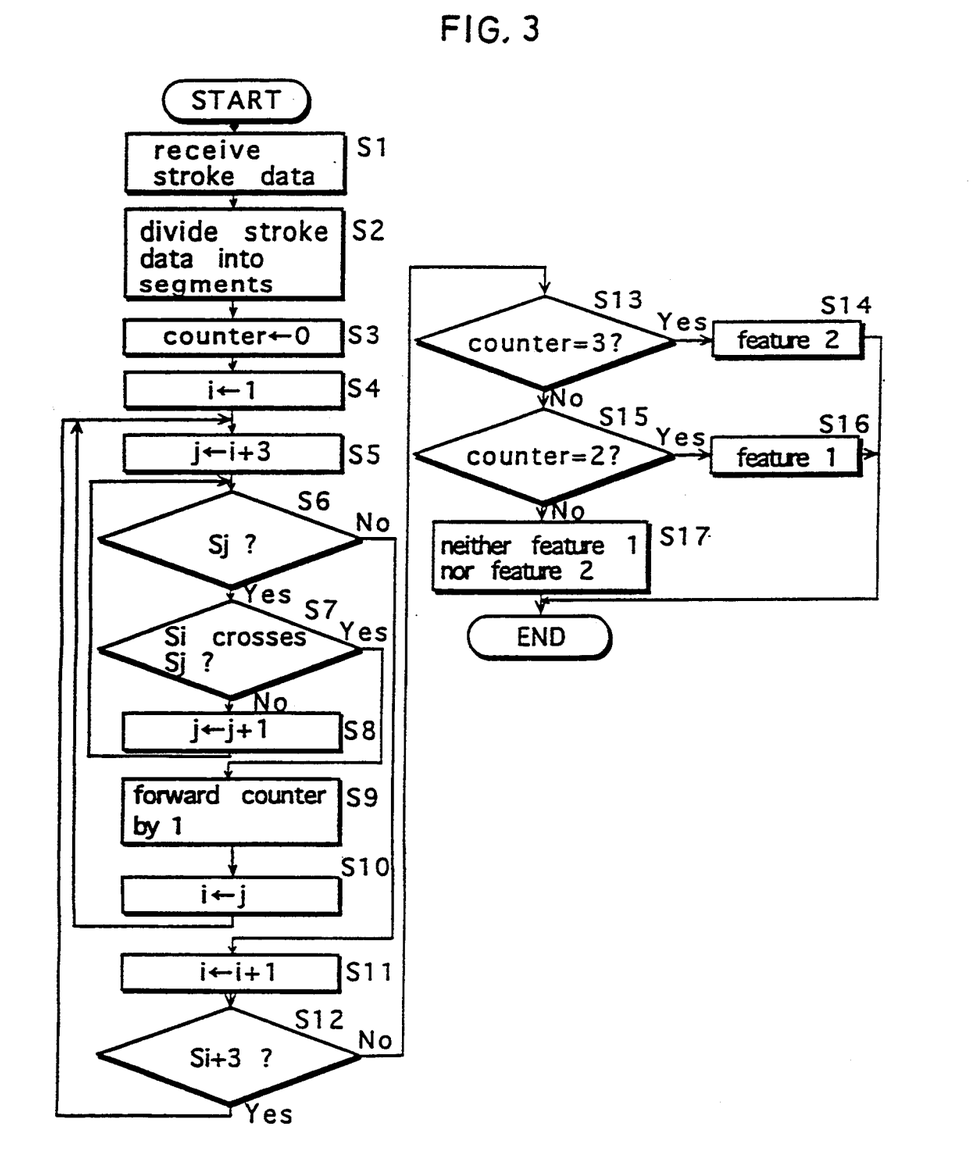
FIG. 3 is a flow chart depicting an example of predetermined feature detection.
Figure 4:
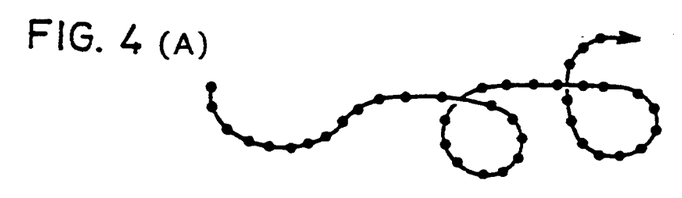
FIG. 4(A), FIG. 4(B) and FIG. 4(C) show segmentation of stroke data.

Operation of the predetermined feature detection unit 102 which manipulates the predetermined features 1 and 2 will be described with reference to FIGS. 3 as well as FIG. 4(A), FIG. 4(B), and FIG. 4(C). FIG. 3 is a flow chart depicting a detection process of the predetermined character detection unit 102; and FIG. 4(A), FIG. 4(B), and FIG. 4(C) show a segmentation process of the stroke data. That is, FIG. 4(A) is a digital map of the stroke data, including a series of xy coordinates each of which identifies the input point of the stroke on the tablet; FIG. 4(B) is the stroke data segmented into four directions; and FIG. 4(C) is the stroke data segmented based upon the segmentation process (1→2→3).

The predetermined character detection unit 102 receives the stroke data including a series of xy coordinates (A) (Step 1). The stroke data are segmented (B) so that a figure feature of the data is easily identified (Step 2).

The segmentation process at Step 2 will be described with reference to FIG. 4(C). At (1), part of the stroke data is divided into three vectors a1, a2, a3. At (2), the three segments are expressed in major vectors b1, b2, b3; each of which is approximate to the vectors a1, a2, a3 respectively. At (3), the vectors b1 and b2 are combined to be c1 since the vector b2 places next to the vector b1 while both the vector b1 and the vector b2 aim in the same direction; and the vector b3 standing alone is renamed as c2. This segmentation process (1)–(3) is disclosed in [Tomimoto, T., Shima, K & Ota, H, "On-line Recognition Method of Handprinted Japanese Characters," edited by Matsushita Electric Industrial Co., Ltd. W. R. L., 15 Oct. 1982, pp. 49–56.] The entire stroke data processed through this segmentation process (1)–(3)are shown in (B), from Segment 1 (Se1) through Segment 12 (se12).

At Step 3 of the detection process of the predetermined feature detection unit 102, a counting value at a counter is cleared off so that the number of the circles to be detected from the stroke data (B) will be provided thereto at each detection.

Inclusion of a circle in the stroke data will be detected now. A start segment from which the stroke data start is referred to as Si; and an end segment at which the stroke data end is referred to as Sj. A value 1 is provided to the segment Si (Step 4). Since a circle consists of four consecutive segments, i+3 is set at the end segment Sj (Step 5). The existence or absence of the segment having the value i+3 to be the end segment Sj is examined (Step 6). It is assumed that the end segment Sj of the value i+3 is found at Step 6. Subsequently, whether or not the segment Si crosses the segment Sj and vice versa is detected (Step 7). That is, the existence or absence of a circle is detected by examining if the segments Si and Sj cross each other. Further, it is assumed that they cross each other so that a circle is found at Step 7. The counting value at the counter forwards by 1 (Step 9). Then, the end segment Sj is changed into a start segment Si for next stroke data (Step 10), and detection of a circle in the next stroke data starts from Step 6 in the above.

In another case it is assumed that the segment Si and the segment Sj do not cross with each other at Step 7. In this case, the value of the end segment Sj forwards by 1 (Step 8), and the unit 102 goes back to Step 6 to examine the existence or absence of the end segment Sj.

It is assumed that the end segment Sj is not found at Step 6. In this case, the value of i forwards by 1 (Step 11), and the existence or absence of the end segment Si+3 is detected (Step 12). If the end segment Si+3 is found, the unit 102 goes back to Step 5, so that the existence or absence of a circle is detected.

If the end segment Si+3 is not found at Step 12; however, detection of a circle terminates. Subsequently, the counting value at the counter is checked. The value three at the counter (Step 13) indicates that the feature 2 is detected (Step 14); while the value two at the counter (Step 15) indicates that the feature 1 is detected (Step 16). Taking the feature 1 as an example, from the stroke data segmented as in FIG. 4(B) a circle including a start segment Se4 and an end segment Se7 as well as a circle including a start segment Se8 and an end segment Se1 will be detected.

If the value at the counter indicates a value other than three or two; however, the predetermined feature detection unit 102 concludes the detection that no predetermined features are found in the stroke data (Step 17).

Although the circle features are employed in the above, zigzag features can be employed in a substantially same manner. That is, two zigzags or three zigzags will be provided to the stroke error, and the erasing operation is conducted in accordance with detection of two zigzags for the feature 1 or three zigzags for the feature 2.

The detection of the zigzag features will be described briefly. Stroke data are segmented through the above segmentation process (1)–(3). The existence or absence of a zigzag is detected by examining the existence or absence of two turning points. That is, if three consecutive segments are long, short, and long in order; and the two long segments aim in opposite directions, a turning point will be found in the short segment placing between the long segments. Further, if two consecutive segments aim in opposite directions, the contact point of the two segments will be another turning point. Consequently, a zigzag will be detected only when a combination of the above two turning points are detected.

Owing to the characteristics of the above detection method, a feature other than the above feature 1 and 2 can be employed depending on the character. For example, the circles or the zigzags can be overlapped among themselves instead of describing them with a space therebetween. Also only one of the feature 1 and the feature 2, in either the circle shape or the zigzag shape, may be employed in correction of the stroke error. That is, the stroke erasure unit exclusively engages in either erasing operation of single stroke or erasing operation of entire character. Further, detection methods other than the above may be employed by the predetermined feature detection unit 102 to achieve the substantially same function.

Figures 5A, 5B:
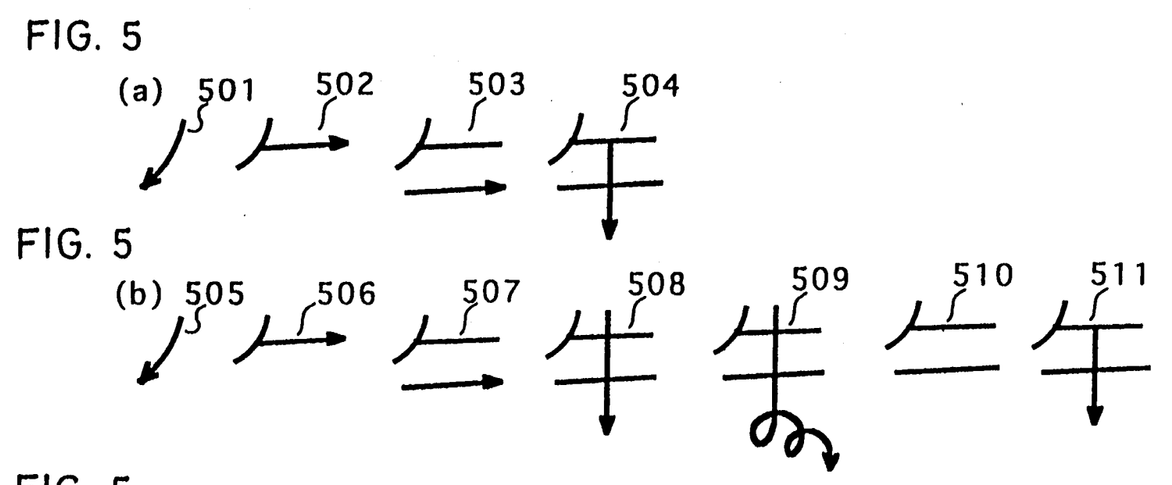
FIG. 5(a), FIG. 5(b) and FIG. 5(c) show input of stroke data by the handwritten character input device in FIG. 1.
Figure 5C:
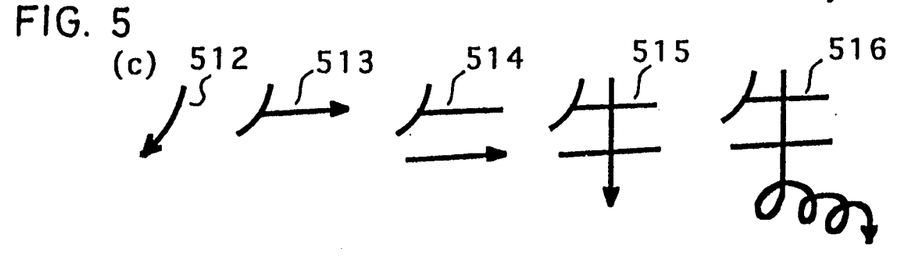

Operation of the handwritten character input device in FIG. 1 will be described with reference to FIG. 5(a), FIG. 5(b), and FIG. 5(c). FIG. 5(a) represents correct input of the character; FIG. 5(b) represents input of the same character as (a) except that it includes the stroke error replaced with the correct stroke; and FIG. 5(c) represents input of the same character as (a) except that it includes the stroke error replaced with rewrite of the character.

The operation of the handwritten character input device employed in the above (a)–(c) will be described in detail. In (a)–(c), strokes are drawn with stylus pen on the tablet; and the circle feature examples are employed.

The operation of (a) to draw a character 504 will be described hereunder. First, stroke data 501 (an arrow represents a direction of a stroke) are provided to the predetermined feature detection unit 102 and to the stroke erasure unit 103. Next, the predetermined feature detection unit 102 detects whether or not the input data include the feature 1 or the feature 2. It is detected that the stroke data 501 do not include either the feature 1 or the feature 2; and this will be informed to the stroke erasure unit 103. Consequently, the stroke data 501 will remain unerased. Similarly, none of stroke data 502 through 504 have the feature 1 or the feature 2; consequently, they will remain unerased. The stroke data remaining unerased after the examination of the predetermined feature detection unit 102 are then transferred to the character recognition unit 104.

The detection method employed by the predetermined feature detection unit 102 to detect the feature 1 and the feature 2 in the stroke data was described in the above; and will not be repeated.

The operation of (b) including the stroke error replaced with the correct stroke will be described. Substantially same as the operation (a), stroke data 505 through 507 are valid since none of them have the feature 1 or 2. In input of stroke data 508; however, the user recognizes that the stroke was drawn on the tablet 101 incorrectly, and adds two circles at the end of the stroke data 508 (feature 1), which will be referred to as stroke data 509 hereinafter.

Detecting the feature 1 included in the stroke data 509, the predetermined feature detection unit 102 informs this to the stroke erasure unit 103. Subsequently, the stroke erasure unit 103 cancels the stroke data 509 as well as erases the stroke data 509. Consequently, stroke data 510, which include strokes up to input of the stroke data 507, will be provided to the character recognition unit 104; and the character will be identified thereby based upon stroke data 511 including the stoke data 510 and a correct stroke at the place of the stroke data 508.

The operation of (c) including the stroke error replaced with rewrite of the character will be described. The same as in the operation (a), stroke data 512 through 514 remain unerased since none of them have either the feature 1 or 2. In input of stroke data 515; however, the user recognizes that the stroke is drawn on the tablet 101 incorrectly, and adds three circles at the end of the stroke data 515 (feature 2), which will be referred to as stroke data 516 hereinafter.

Detecting the feature 2 included in the stroke data 516, the predetermined feature detection unit 102 informs this to the stroke erasure unit 103. Subsequently, the stroke erasure unit 103 cancels all of the stroke data 512 through 516 as well as erases them. Consequently, no stroke data will be provided to the character recognition unit 104.

Additionally, a stroke error can be detected in input of English handwritings, although in the above a Chinese character is employed as an example. When writing block type letters, a single stroke or a whole letter comprised of strokes will be erased upon detection of a stroke error. When writing script type letters; on the other hand, the number of the circles or zigzags for the predetermined feature may be different from two or three so that it will not be included in any of existing English words; then the letters within a single stroke will be erased upon detection of a stroke error.

Embodiment 2

Figure 6:
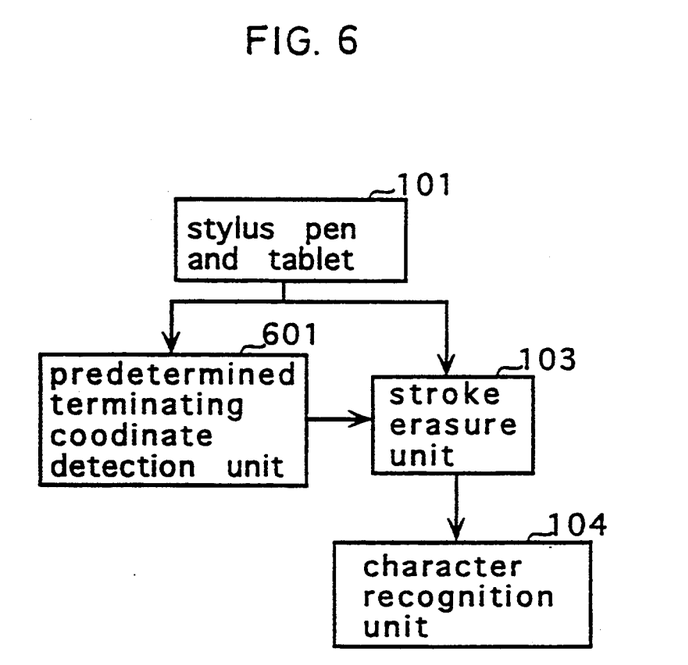
FIG. 6 is a block diagram depicting construction of the handwritten character input device in a second embodiment of the present invention.

Construction of a handwritten character input device employed in a second embodiment of the present invention will be described hereunder with reference to FIG. 6, in which like components are labeled with like reference numerals with respect to the first embodiment, and the description of these components is not repeated. As shown in the figure, the handwritten character input device comprises the digitizer 101 consisting of the stylus pen and the tablet, the stroke erasure unit 103, the character recognition unit 104, and a predetermined terminating coordinate detection unit 601 which is employed in place of the predetermined feature detection unit 102 in the first embodiment so that the incorrect stroke will be detected based upon terminating xy coordinates of the stroke.

Figure 7:
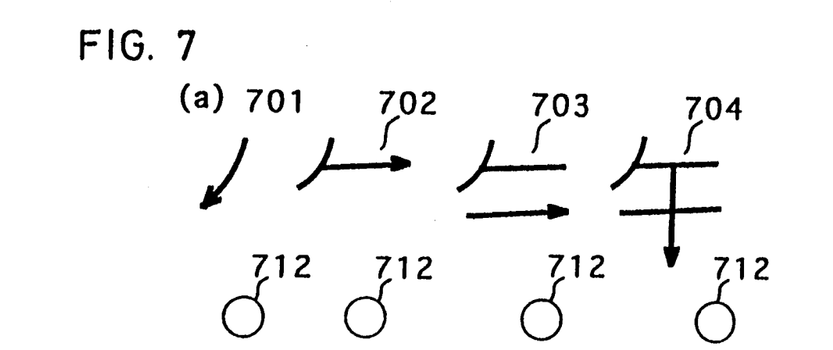
FIG. 7(a) and FIG. 7(b) show input of stroke data by the handwritten character input device in FIG. 6.

Operation of the handwritten character input device in FIG. 6 will be described with reference to FIG. 7(a) and FIG. 7(b). FIG. 7(a) represents correct input of the character; FIG. 7(b) represents input of the same character as (a) except that it includes the stroke error to be replaced with the correct stroke. A circle 712 on the tablet represents the area for the terminating xy coordinates of the incorrect stroke; thereby, the stroke data ending inside of the circle 712 will be cancelled.

Operation of the handwritten character input device employed in (a) and (b) will be described in detail. Substantially same as in the first embodiment, strokes are drawn with the stylus pen on the tablet.

The operation of (a) to draw a character 704 will be described hereunder. First, stroke data 701 are provided to the predetermined terminating coordinate detection unit 601 and to the stroke erasure unit 103. Next, the predetermined terminating coordinate detection unit 601 detects whether or not the terminating xy coordinates of the stroke data 701 place inside of the predetermined terminating coordinate area 712. It is detected that the terminating xy coordinates of the stroke data 701 are outside of the predetermined terminating coordinate area 712; and this will be informed to the stroke erasure unit 103. Consequently, the stroke data 701 will remain unerased. Similarly, stroke data 702 through 704 end outside of the predetermined terminating coordinate area 712; consequently, they remain unerased. The stroke data remaining unerased after the examination of the predetermined terminating coordinate detection unit 601 are then transferred to the character recognition unit 104. Thus, the character recognition unit 104 recognizes the character based on the received stroke data.

The operation of (b) including the stroke error replaced with the correct stroke will be described. Substantially same as the operation of (a), stroke data 705 through 707 are valid since none of them end inside of the predetermined terminating coordinate area 712. In input of stroke data 708; however, the user recognizes that the stroke includes a stroke error, and ends the stroke inside of the area, which will be referred to as stroke data 709 hereinafter..

Detecting that the end of the stroke data 709 places inside of the area 712, the predetermined terminating coordinate detection unit 601 informs this to the stroke erasure unit 103. Subsequently, the stroke erasure unit 103 cancels the stroke data 709 as well as erases the stroke data 709. The result of this cancellation and erasure will be stroke data 710 equivalent to the stroke data 707; and stroke data 711 including the stroke data 710 and a correct stroke at the place of the stroke data 708 will be provided to the character recognition unit 104.

In the above the predetermined terminating coordinate area places at the end of the character; however, this area may be placed other than the above in accordance with the kind of the handwritten character input device. For example, the area may surround the character to input; and the stroke placing outside of the area will be cancelled and then erased. As another example, a plurality of predetermined terminating coordinate areas may be formed on the tablet. With a plurality of predetermined terminating coordinate areas, either the incorrect stroke to which the predetermined feature was provided or the strokes drawn prior to detection of the predetermined feature will be selected and erased upon each erasing operation. Further, the stroke including the predetermined feature was erased in the Embodiment 1; however, the stroke drawn anytime before the predetermined feature may be erased if desired.

Additionally, the same as the first embodiment, a stroke error can be detected in input of English handwritings, although in the above a Chinese character is employed as an example. When writing block type letters, a single stroke or a whole letter consisting of strokes will be erased upon detection of a stroke error. When writing script type letters; on the other hand, the letters within a single stroke will be erased upon detection of a stroke error.

Although the present invention has been fully described by way of examples with reference to the accompanying figures, it is to be noted that various changes and modifications will be apparent to those skilled in the art. Therefore, unless otherwise such changes and modifications depart from the scope of the present invention, they should be constructed as being included therein.

What is claimed is:

1. A handwritten character input method for entering a handwritten character, which is formed of at least one stroke and drawn with a stylus pen on a tablet, into a microcomputer, the method comprising:
   a request has been made
   a first step at which stroke data representing individual strokes of the handwritten character are individually received;
   a second step at which an examination is made of whether a request has been made for the cancellation and deletion of either stroke data representing an individual stroke being inputted or stroke data representing an individual stroke already inputted;
   a third step at which stroke data is cancelled and erased in accordance with the examination at the second step; and
   a fourth step at which the handwritten character is identified based upon at least part of the stroke data remaining unerased after the cancellation and the erasure at the third step.

2. The handwritten character input method of claim 1, wherein the examination at the second step includes segmentation of the stroke as well as detection of a predetermined feature in the stroke.

3. The handwritten character input method of claim 2, wherein the predetermined feature to be detected includes one of circles and zigzags, the number of the circles and zigzags being determined beforehand so that the predetermined feature will be different from any of existing letters.

4. The handwritten character input method of claim 1, wherein at the second step it is detected if terminating xy coordinates of the stroke included in a stroke data is located inside of a predetermined area, the number of the predetermined area being one or more than one.

5. The handwritten character input method of claim 4, wherein the predetermined area includes a first area and a second area, the stroke ending in the first area indicating that stroke data to be erased at the third step includes all of the strokes which have been entered into the handwritten character input device, and the stroke ending in the second area indicating that the stroke data to be erased at the third step includes part of the strokes which have been entered into the handwritten character input device.

6. A handwritten character input device for drawing one or more strokes on a tablet with a stylus pen to enter a handwritten character or a handwritten word into a microcomputer accommodated inside of the handwritten character input device, the handwritten character input device comprising:
   a stroke data inputting means for inputting separate stroke data for each of the strokes drawn on the tablet;
   a stroke data erasing means for invalidating one of stroke data which is being inputted, the entire stroke data which was already inputted, and a part of the stroke data which was already inputted, and for erasing the invalid stroke data;
   a directing means for directing the stroke data erasing means as to what is to be erased, in which the directing means directs each erasing action according to one of a plurality of predetermined stroke features added to the stroke during its inputting, the directing means comprising a detecting means for detecting the added stroke feature; and
   a recognizing means for recognizing a character or a word, based upon the inputted stroke data.

7. The handwritten character input device of claim 6, wherein the detecting means detects one of the plurality of predetermined stroke features in an extension of a stroke which is being down, or detects that the stroke being drawn is further extended to end in a predetermined area constructed outside of a usual character input area on the tablet, the predetermined area being one or more in number.

8. The handwritten character input device of claim 7, wherein each predetermined stroke feature represents a stroke feature different from the stroke which was already drawn, the stroke feature including a predetermine number of circles or a predetermine number of zigzags.

9. The handwritten character input device of claim 8, wherein the detecting means further comprises:

means for dividing the stroke into segments, the stroke representing a digital map of xy coordinates each of which is relevant for an input point of the stroke on the tablet, by forming an original vector from two adjacent points to aim at a direction that the stroke is drawn, and replacing the original vector with one of an x vector and a y vector which is approximate to the original vector, the x vector and the y vector being perpendicular to each other;

means for detecting if a start segment and an end segment of four or more consecutive segments cross with each other, the start segment with which the stroke starts and the end segment with which the stroke ends, whereby the detection of the circle is operated;

means for, if three consecutive segments include a long segment, a short segment, and a long segment in order, and the two long segments aim at opposite directions to each other, for detecting a turning point at the short segment, also for detecting another turning point if two consecutive segments aim at opposite directions to each other, whereby the detection of the zigzag is operated.

10. The handwritten character input device of claim 9, wherein the detecting means determines what is to be erased according to the number of the detected circles and zigzags being the predetermined stroke feature, and directing each erasing.

11. The handwritten character input device of claim 6 further including character recognition means for recognizing the handwritten character based upon stroke data remaining unerased after the cancellation and the erasure of the stroke data erasure means.

12. The handwritten character input device of claim 7, wherein the directing means determines what is to be erased by detecting if the stroke which is being drawn ends in the predetermined area, and directing each erasing.

13. The handwritten character input device of claim 8, wherein the predetermined area is one of a first area and a second area, the stroke ending in each of the first area and the second area informing the erasure request detection means that all the strokes and part of the strokes are to be erased respectively, the strokes having been drawn on the tablet.

14. The handwritten character input device of claim 12 further comprising:

means for dividing the stroke into segments, the stroke representing a digital map of xy coordinates each of which is relevant for an input point of the stroke on the tablet, by forming an original vector from adjacent input points to aim in a direction that the stroke is drawn, and replacing the original vector with one of an x vector and a y vector which is approximate to the original vector, the x vector and the y being perpendicular to each other; and means for detecting if a start segment and an end segment of consecutive segments cross one another, the start segment being where the stroke starts and the end segment being where the stroke ends, the number of the consecutive segments being four or more, whereby the detection of the circles is operated.

15. The handwritten character input device of claim 12 further comprising:

means for dividing the stroke into segments, the stroke representing a digital map of xy coordinates each of which is relevant for an input point of the stroke on the tablet, by forming an original vector from adjacent input points to aim in a direction that the stroke is drawn, and replacing the original vector with one of x vector and y vector which is approximate to the original vector, the x vector and the y being perpendicular to each other;

means for detecting a turning point if it is detected that three consecutive segments include a long segment, a short segment, and a long segment in order, as well as the two long segments aim at opposite directions from each other; and means for detecting another turning point if it is detected that two consecutive segments aim at opposite directions from each other, whereby the detection of the zigzags is operated.

16. A handwritten character input device for entering a handwritten character into a microcomputer accommodated inside of the handwritten character input device, the handwritten character input device comprising: a digitizer including a stylus pen and a tablet, the stylus pen for drawing the handwritten character on the tablet, the handwritten character being formed of at least one stroke;

erasure request detection means for detecting if erasure of the strokes is requested when they include a predetermined feature, the predetermined feature being one of first number and second number of one of circles and zigzags, the first number indicating that all of the strokes which have been drawn on the tablet are to be erased, and the second number indicating that part of the strokes which have been drawn on the tablet are to be erased;

stroke data erasure means for cancelling stroke data corresponding to strokes which were drawn on the tablet and transferred to the stroke data erasure means, and for erasing them if a request for the erasing operation is detected by the erasure request detection means;

means for dividing the stroke into segments, the stroke representing a digital map of xy coordinates each of which is relevant for an input point of the stroke on the tablet, by forming an original vector from adjacent input points to aim in a direction that the stroke is drawn, and replacing the original vector with one of an x vector and a y vector which is approximate to the original vector, the x vector and the y vector being perpendicular to each other; and means for detecting if a start segment and an end segment of consecutive segments cross one another, the start segment being where the stroke starts and the segment being where the stroke ends, the number of the consecutive segments being four or more, whereby the detection of the circles is operated.

17. A handwritten character input device for entering a handwritten character into a microcomputer accommodated inside of the handwritten character input device, the handwritten character input device comprising:

a digitizer including a stylus pen and a tablet, the stylus pen for drawing the handwritten character on the tablet, the handwritten character being formed of at least one stroke;

erasure request detection means for detecting if erasure of the strokes is requested when they include a predetermined feature, the predetermined feature being one of first number and second number of one of circles and zigzags, the first number indicating that all of the strokes which have been drawn on the tablet are to be erased, and a second number indicating that part of the strokes which have been drawn on the tablet are to be erased;

stroke data erasure means for cancelling stroke data corresponding to strokes which were drawn on the tablet and transferred to the stroke data erasure means, and for erasing them if a request for the erasing operation is detected by the erasure request detection means;

means for dividing the stroke into segments, the stroke representing a digital map of xy coordinates each of which is relevant for an input point of the stroke on the tablet, by forming an original vector from adjacent input points to aim in a direction that the stroke is drawn, and replacing the original vector with one of x vector and y vector which is approximate to the original vector, the x vector and the y being perpendicular to each other;

means for detecting a turning point if it is detected that three consecutive segments include a long segment, a short segment, and a long segment in order, as well as the two long segments aim at opposite directions from each other; and means for detecting another turning point if it is detected that two consecutive segments aim at opposite directions from each other, whereby the detection of the zigzags is operated.

* * * * *